United States Patent
Teboulle et al.

(10) Patent No.: US 12,449,452 B2
(45) Date of Patent: Oct. 21, 2025

(54) FIRE DETECTION BY A PRE-EXISTING ELECTRICITY METER

(71) Applicant: SAGEMCOM ENERGY & TELECOM SAS, Bois-Colombes (FR)

(72) Inventors: Henri Teboulle, Bois-Colombes (FR); Christophe Grincourt, Bois-Colombes (FR); Marc Jeanrot, Bois-Colombes (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 0 days.

(21) Appl. No.: 19/040,739

(22) Filed: Jan. 29, 2025

(65) Prior Publication Data

US 2025/0246056 A1    Jul. 31, 2025

(51) Int. Cl.
*G01R 22/06* (2006.01)
*G08B 17/103* (2006.01)

(52) U.S. Cl.
CPC ........... *G01R 22/068* (2013.01); *G01R 22/06* (2013.01); *G08B 17/103* (2013.01)

(58) Field of Classification Search
CPC ...... G01R 15/20; G01R 15/207; G01R 21/00; G01R 21/001; G01R 21/06; G01R 22/00; G01R 22/063; G01R 35/00; G01R 35/005; G08B 17/00; G08B 17/107; G08B 21/14

See application file for complete search history.

(56) References Cited

U.S. PATENT DOCUMENTS 8,930,152 B2 *  1/2015  Patel .................... G01R 15/207
                                                  702/62
9,607,787 B2 *  3/2017  Mittleman ............... H04N 5/77

FOREIGN PATENT DOCUMENTS

| EP | 2083406 B1 | 7/2010 |
| FR | 3009623 A1 | 2/2015 |
| FR | 3100409 A1 | 3/2021 |
| GB | 2461348 A | 1/2010 |

* cited by examiner

*Primary Examiner* — Van T Trieu
(74) *Attorney, Agent, or Firm* — MUNCY, GEISSLER, OLDS & LOWE, P.C.

(57) ABSTRACT

An ancillary apparatus arranged to be mounted on an electricity meter which includes a primary port to which the electricity meter applies a supply voltage includes a secondary port arranged to be connected to the primary port when the apparatus is mounted on the meter, the apparatus thus being electrically powered by the supply voltage, and a secondary processing unit arranged to transmit a message to the meter by modulating a supply current of the apparatus that is produced by the meter and flows via the primary port and the secondary port.

14 Claims, 3 Drawing Sheets

FIRE DETECTION BY A PRE-EXISTING ELECTRICITY METER

The invention relates to the field of electricity meters, more particularly to improving pre-existing electricity meters.

BACKGROUND

It is possible, albeit extremely unlikely, that incorrectly installing an electricity meter will cause a fire.

When installers connect the electrical supply cables to the meter terminal block, they position the conductors in the power terminals and then tighten them mechanically. However, if they do not tighten one of the cables enough, a resistance is created in the region of the terminal in question. This resistance can cause heating which can, on very rare occasions, cause a flame to appear, sparking a fire. It is therefore not the meter itself that has caused the fire but said incorrect installation.

In the event that a fire occurs in the room in which the electricity meter is located, it would be very beneficial for the meter to able to detect the fire and generate an alarm message. This makes it possible to quickly take measures to limit the impact of the fire. It would also be very beneficial to be able to determine with certainty whether the electricity meter (or rather its installation) is causing this fire or whether the fire has been caused by something else.

The aim is to implement this dual detection function (detecting both the fire and the cause of the fire) in a pre-existing meter, i.e. one that has already been designed or even already installed (and therefore sealed) at the customer's premises.

This function therefore has to be implemented without requiring any physical modifications (whether mechanical or electronic) to the meter and, if possible, should have a reduced cost.

Object

The object of the invention is:
- to detect the occurrence of a fire in a room in which an electricity meter is located;
- to determine whether or not the meter is the cause of the fire;
- and to do so without physically modifying the meter and at a reduced cost.

SUMMARY

To achieve this object, an ancillary apparatus is proposed, said apparatus being arranged to be mounted on an electricity meter which may comprise at least one primary port to which the electricity meter applies a supply voltage, the ancillary apparatus comprising:
- at least one secondary port arranged to be connected to the at least one primary port when the ancillary apparatus is mounted on the meter, the ancillary apparatus thus being electrically powered by the supply voltage;
- a secondary processing unit arranged to transmit at least one message to the electricity meter by modulating a supply current of the ancillary apparatus that is produced by the meter and flows via the at least one primary port and the at least one secondary port.

Some electricity meters have an interface providing a supply voltage and a supply current that are accessible from outside the meter. By way of example, the interface is a CIS interface that includes a power supply function and a one-way communication function, thus making it possible to supply power and to transmit data to a CIS receiver mounted on the meter.

The ancillary apparatus can therefore be mounted on such a meter, be powered by the supply voltage of the interface and transmit a message to the meter by modulating the supply current.

The message is therefore transmitted to the meter by the ancillary apparatus using this pre-existing interface, which, however, does not provide for two-way communication.

The ancillary apparatus may include a smoke detection device, and the message transmitted to the meter may contain an indication of whether smoke is present outside the meter. This not only allows a fire to be detected but also provides conclusive proof that the meter is not the cause of the fire.

The ancillary apparatus is very inexpensive as it only requires very simple components to transmit the message to the meter and detect the smoke.

The ancillary apparatus is mounted on the meter without requiring any physical modifications to the meter. All that is required is to load suitable software onto the meter so that the meter processes the messages transmitted by the ancillary apparatus (and, for example, emits an alarm message in the event of a fire).

In addition, an ancillary apparatus as described above is proposed, the secondary processing unit comprising:
- a processing component;
- an energy reserve component;
- a switch arranged such that when the switch is closed the processing component is powered by the supply current, and when the switch is open the processing component is powered by a reserve current from the energy reserve component;
- the processing component being arranged to modulate the supply current by opening and closing the switch.

In addition, an ancillary apparatus as described above is proposed, wherein the secondary processing unit transmits the at least one message to the electricity meter by producing at least one low state of the supply current.

In addition, an ancillary apparatus as described above is proposed, wherein the secondary processing unit transmits the at least one message to the electricity meter by producing a signature comprising a predefined sequence of high states and low states with predefined durations.

In addition, an ancillary apparatus as described above is proposed, comprising a housing provided with at least one opening and in which the secondary processing unit and a smoke detection device are integrated, the smoke detection device being arranged to detect smoke particles that have come from outside the ancillary apparatus and entered the ancillary apparatus through the at least one opening, the at least one message containing information relating to the presence of the smoke particles.

In addition, an ancillary apparatus as described above is proposed, the smoke detection device comprising a light emitter, arranged to emit light signals, and a light receiver, which are positioned in the housing of the ancillary apparatus such that:
- when the housing does not contain smoke particles, the light receiver does not detect the light signals emitted by the light emitter;
- when the housing contains smoke particles, the light signals emitted by the light emitter are at least partly reflected by said smoke particles and detected by the light receiver.

In addition, an electricity meter is proposed, said electricity meter arranged such that an ancillary apparatus as described above can be mounted on said electricity meter, the electricity meter comprising:
- a current sensor arranged to measure the supply current;
- a primary processing unit arranged to retrieve the at least one message from current measurements produced by the current sensor.

In addition, an electricity meter as described above is proposed, said electricity meter being arranged such that an ancillary apparatus as described above can be mounted on said electricity meter, the primary processing unit of the electricity meter being arranged to detect a fire occurring outside the meter if smoke particles are present in the ancillary apparatus.

In addition, an electricity meter as described above is proposed, wherein a temperature sensor is also included, the primary processing unit being arranged to evaluate an ambient temperature outside the meter from temperature measurements produced by the temperature sensor, the primary processing unit being arranged to detect a fire occurring outside the meter:
- if smoke particles are present in the ancillary apparatus;
- and/or if the ambient temperature is above a predefined threshold.

In addition, an electricity meter as described above is proposed, the primary processing unit being arranged to evaluate the ambient temperature from the temperature measurements and from measurements of a current supplied to an installation, the electrical energy consumption of which is measured by the electricity meter.

In addition, a system comprising an ancillary apparatus as described above and a meter as described above is proposed.

In addition, a method for detecting a fire and a cause of the fire is proposed, said method being carried out in the main processing unit of the meter as described above and comprising the steps of:
- acquiring the message that contains the information relating to the presence of the smoke;
- detecting a fire occurring outside the meter if smoke particles are present in the ancillary apparatus.

In addition, a method as described above is proposed, said method being carried out in the main processing unit of the meter as described above and further comprising the steps of:
- evaluating the ambient temperature outside the meter;
- detecting a fire occurring outside the meter if smoke particles are present in the ancillary apparatus and/or if the ambient temperature is above a predefined threshold.

In addition, a computer program is proposed, comprising instructions which cause the primary processing unit of the meter as described above to execute the steps of the method for detecting a fire and the cause of the fire as described above.

In addition, a computer-readable storage medium is proposed, on which the computer program as described above is stored.

The invention will be better understood in the light of the following description of a particular, non-limiting embodiment of the invention.

BRIEF DESCRIPTION OF THE DRAWINGS

Reference will be made to the accompanying drawings, in which.

DETAILED DESCRIPTION

Figure 1:
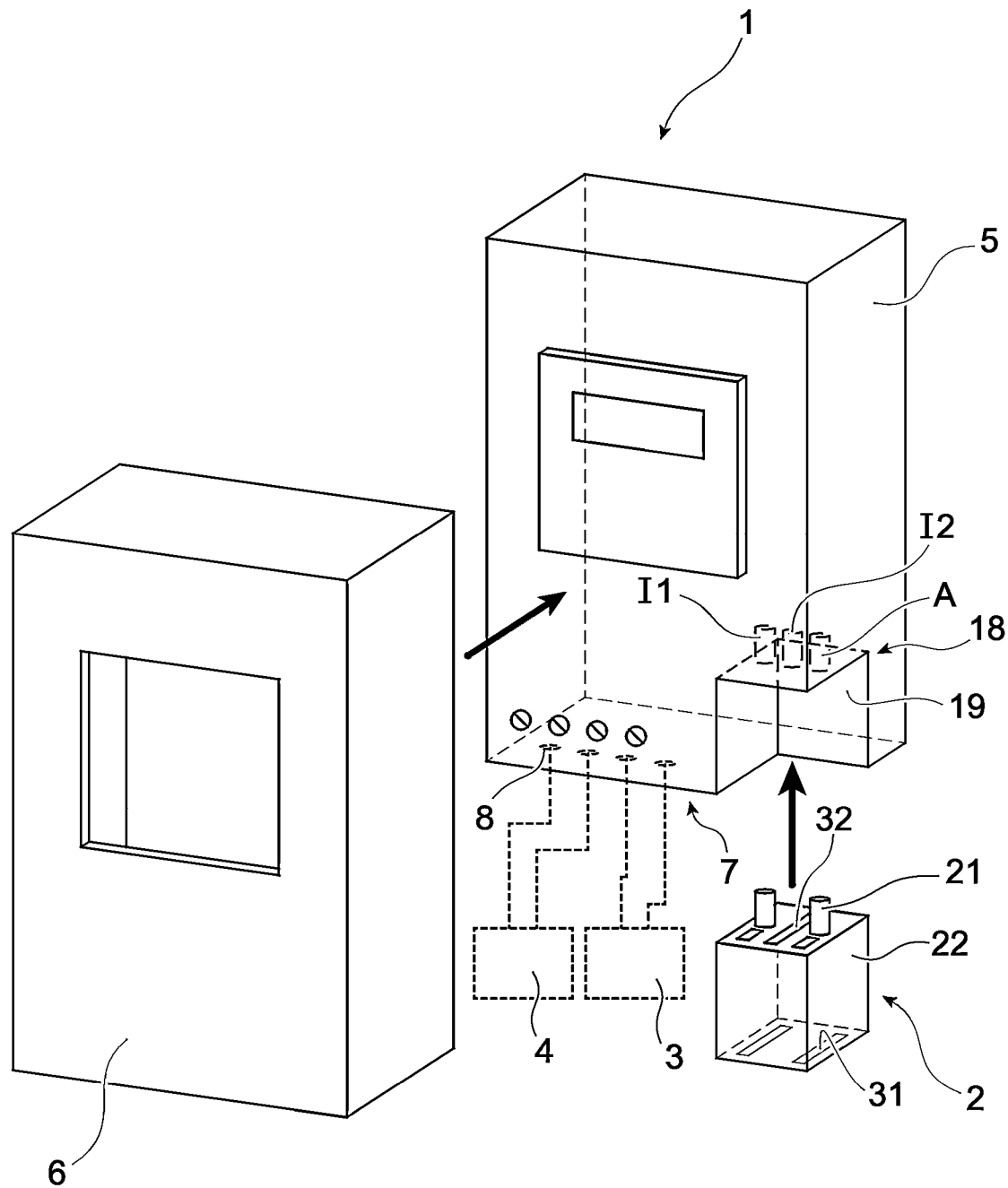
FIG. 1 is a perspective view of the electricity meter, its cover and the ancillary apparatus.
Figure 2:
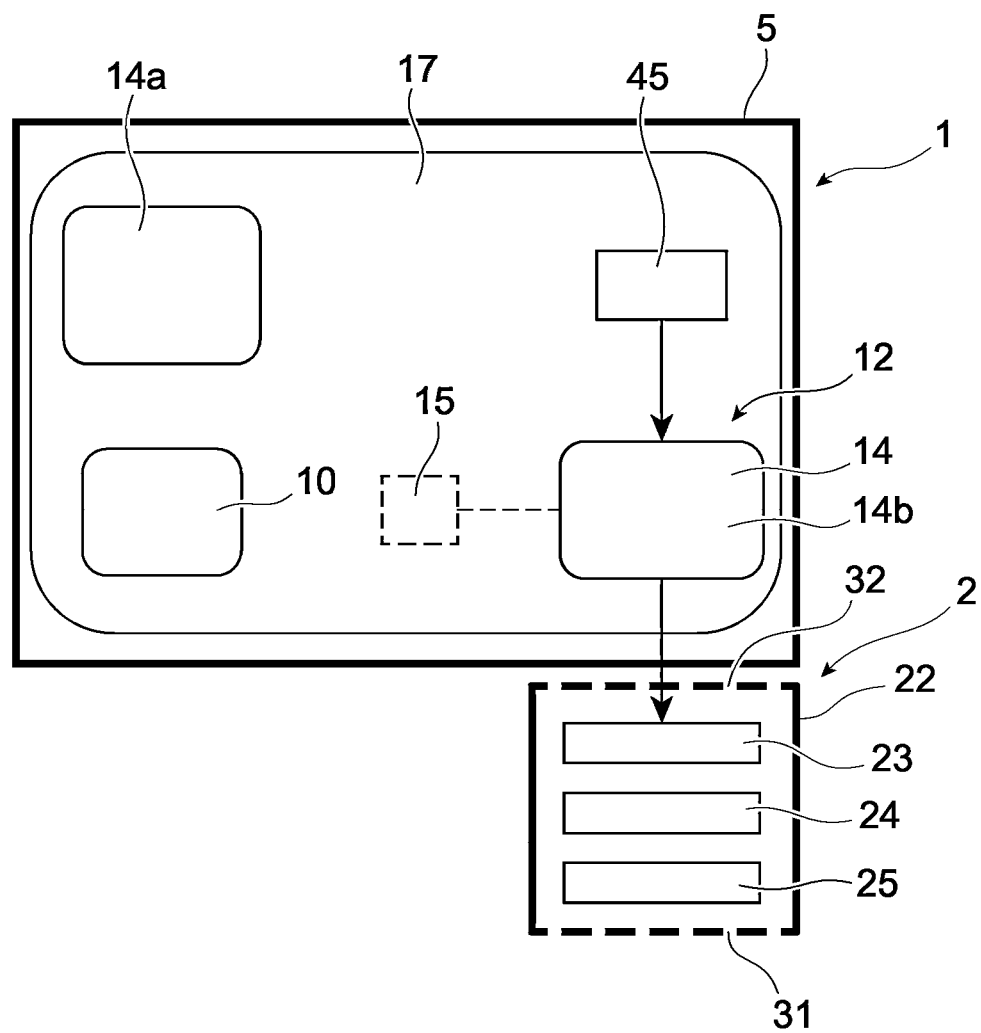
FIG. 2 is a simplified sectional view of the electricity meter and the ancillary apparatus along a plane parallel to the front face of the meter.
Figure 3:
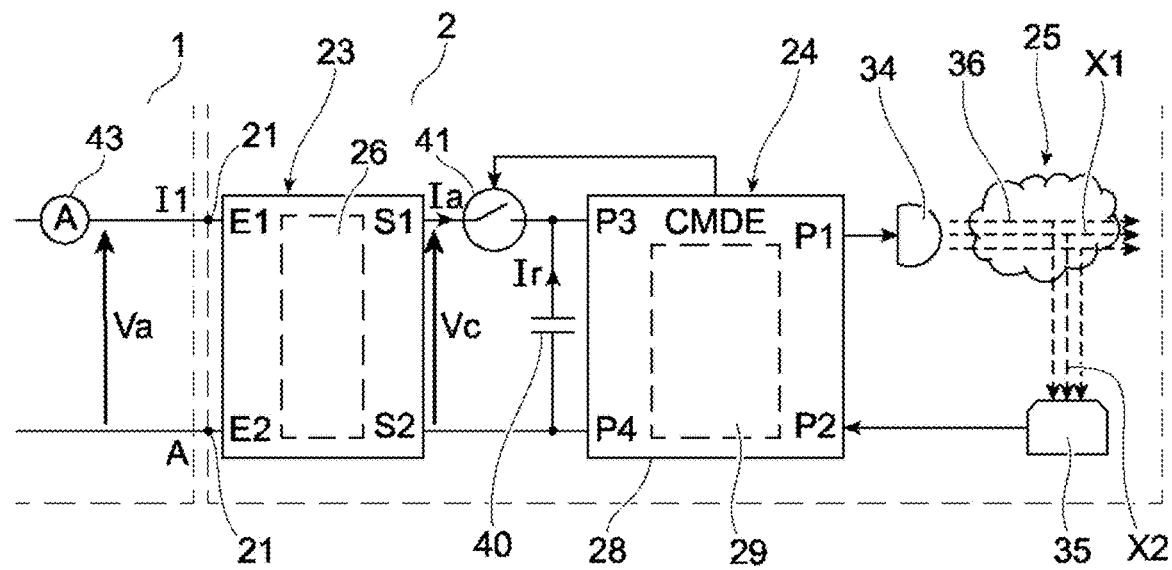
FIG. 3 is a simplified diagram of the meter and the ancillary apparatus.

With reference to FIGS. 1 to 3, the electricity meter 1 is a "pre-existing" communicating meter, i.e. it was designed prior to the present invention being created and without taking the ancillary apparatus 2 into account.

The electricity meter 1 is intended for measuring the electrical energy consumption of an installation 3 and for transmitting the measurements to the information system (IS) of the electricity supplier. This electrical energy is supplied to the installation 3 by a distribution network 4. In this case, the meter 1 is a single-phase meter, but it could also be a multi-phase meter.

The meter 1 is installed in a room by being positioned against a wall of said room and attached to the wall.

The meter 1 comprises a casing 5 and a removable cover 6 (both made of plastics material, for example). The casing 5 comprises a rear face which is also the rear face of the meter 1 and which is intended to be placed against the wall and attached to the wall. The cover 6 comprises a face which is also the front face of the meter 1 and which the customer or an operator can see and access.

In this case, all the positional terms (front, rear, upper, lower, top, bottom, etc.) should be interpreted while considering the meter 1 installed in its nominal operating position (with its rear face attached to a vertical surface).

The meter 1 comprises a terminal block 7 positioned on the front face of the casing, which can be accessed by removing the cover 6 (as well as another locked and sealed cover; not shown) and comprises power terminals 8 to which the electrical supply cables (connected to the network 4) and the cables connected to the installation 3 are connected.

The meter 1 further comprises sensors (not shown) for measuring the electrical energy consumed by the installation 3. These sensors measure in particular the current flowing through the meter 1 (supplied by the network 4 to the installation 3) and the voltage applied by the network 4 at the input of the installation 3 (and the meter 1).

The meter 1 also comprises a cut-off member 10 which is intended to selectively cut off the current supplied to the installation 3. The cut-off member 10 comprises a switch for each phase of the distribution network 4 (a single switch in this case).

The meter 1 further comprises a primary processing unit 12 (electronic and software). The primary processing unit 12 comprises at least one processing component 14, which is, for example, a "general-purpose" processor, a processor specialising in signal processing (digital signal processor (DSP)), a microcontroller, or a programmable logic circuit, such as an FPGA (field-programmable gate array) or an ASIC (application-specific integrated circuit). The primary processing unit 12 also comprises one or more memories 15 connected to or integrated in the processing component. At least one of these memories 15 forms a computer-readable storage medium on which at least one computer program is stored, said computer program comprising instructions which cause the primary processing unit 12 to execute the steps of the method for detecting a fire and the cause of the fire, which will be described later.

In this case, the primary processing unit 12 comprises a "metrology" microcontroller 14a, which in particular acquires the measurements taken by the sensors of the meter 1 and carries out certain processing operations on said measurements, and an "application" microcontroller 14b, which in particular controls the cut-off member 10. The method for detecting a fire and the cause of the fire is also carried out in the application microcontroller 14b.

In this case, the electronic components of the primary processing unit 12 and the cut-off member 10 are mounted on the same printed circuit 17, which is positioned in the casing 5 in parallel with the front face thereof.

The meter 1 also includes a CIS interface 18 (customer information system). This CIS interface 18 comprises electronic components, which are also mounted on the printed circuit 17, as well as three ports referred to here as I1, I2 and A. The electronic components of the CIS interface 18 implement two functions: a power supply function and a communication function.

The power supply function involves applying a supply voltage Va between the two ports I1 and A, said supply voltage here being an AC voltage (with a frequency of, for example, 50 kHz).

The communication function involves transmitting data by applying a modulated voltage between the two ports I1 and I2. The modulation here is an amplitude modulation of a carrier frequency equal to 50 kHz. The data include, for example, consumption readings, information about the supply agreement, etc. This transmission is one-way; the meter 1 transmits data but cannot receive them through this channel.

The casing 5 of the meter 1 includes a receiving space 19, which is formed by a recess located in the region of a lower part of the front face of the casing 5 and is accessible when the cover 6 is removed. The receiving space 19 is designed to receive a CIS receiver (not shown) and to connect the CIS receiver to the CIS interface 18.

The CIS receiver is thus electrically powered by the power supply function of the CIS interface 18 and receives the data transmitted by the communication function.

The CIS receiver, which includes, for example, a radio module, can thus retransmit these data to an operator or to the customer.

The ancillary apparatus 2 is an optional and removable apparatus mounted on the meter 1. As has been described, the meter 1 is a pre-existing meter. The apparatus 2 can therefore be mounted on the meter 1 either at the end of the assembly of the meter 1 or when the meter 1 is installed at the customer's premises (or between the end of the assembly and the installation), or even when the meter 1 is already installed at the customer's premises.

In this case, the apparatus 2 is intended to allow the meter 1 to detect the occurrence of a fire in the room in which the meter 1 is positioned, but also to provide conclusive proof that the meter 1 is not the cause of this fire.

The apparatus 2 is connected to the meter 1 via the CIS interface 18. It is mounted on the casing 5 by being positioned in the aforementioned receiving space 19.

The apparatus 2 comprises at least one secondary port 21 arranged to be connected to at least one primary port of the meter 1 when the apparatus 2 is mounted on the meter 1. The apparatus 2 in this case comprises two secondary ports 21 which are connected to two primary ports of the meter 1. The two primary ports of the meter 1 are the ports I1 and A. The apparatus 2 is thus electrically powered by the supply voltage Va applied by the meter 1 between said ports. The power consumption of the apparatus 2 is typically 130 mW.

The apparatus 2 comprises a housing 22 inside which a power supply unit 23, a secondary processing unit 24 and a smoke detection device 25 are integrated.

In this case, the power supply unit 23 comprises a rectifier 26 which rectifies the AC supply voltage Va produced by the meter 1, to produce a DC supply voltage Vc (5 V for example). The power supply unit 23 comprises two inputs E1, E2, each connected to one of the secondary ports 21 (and therefore to one of the primary ports I1, A when the apparatus 2 is mounted on the meter 1), and two outputs S1, S2 (a high-potential output S1 and a low-potential output S2), between which the DC supply voltage Vc produced by the power supply unit 23 from the AC supply voltage Va is applied.

The secondary processing unit 24 comprises at least one processing component 28, which is, for example, a "general-purpose" processor, a processor specialising in signal processing (digital signal processor (DSP)), a microcontroller, or a programmable logic circuit, such as an FPGA (field-programmable gate array) or an ASIC (application-specific integrated circuit). The secondary processing unit 24 also comprises one or more memories 29 connected to or integrated in the processing component 28. At least one of these memories 29 forms a computer-readable storage medium on which at least one computer program is stored, said computer program comprising instructions which cause the secondary processing unit 24 to execute the steps of the smoke-detection and communication method, which will be described later.

In this case, the secondary processing unit 24 comprises a microcontroller 28.

The smoke detection device 25 makes it possible to detect whether or not smoke is present outside the meter 1.

The housing 22 of the apparatus 2 comprises at least one opening, advantageously at least one first opening 31 (in this case a plurality of first openings) and at least one second opening 32 (in this case a plurality of second openings).

The first openings 31 are positioned in the region of a lower part of the housing 22 of the apparatus 2 (when the apparatus is mounted on the meter 1). The second openings 32 are positioned in the region of an upper portion of the housing 22 of the apparatus 2.

The first openings 31 form an air inlet through which air can enter the apparatus 2. The second openings 32 form an air outlet through which air can leave the apparatus 2.

The first openings 31 and the second openings 32 give the apparatus 2 a cage-like shape.

When the apparatus 2 is mounted on the meter 1, a space remains between the apparatus 2 and the meter 1, allowing air to escape through the second openings 32.

The air inlet and the air outlet create air circulation. Thus, when smoke is present in the room outside the meter 1, in the surroundings of the meter 1, this smoke rushes into the apparatus 2 via the air inlet 31 and is trapped in the apparatus.

The smoke detection device 25 detects smoke particles that have come from outside the apparatus 2 and entered the apparatus 2 through the at least one first opening 31.

The smoke detection device 25 comprises a light emitter, in this case a light-emitting diode (LED) 34, and a light receiver, in this case a photodiode 35. Here, the LED 34 generates infrared light (for example with a wavelength of 860 nm), which the photodiode 35 can detect when the light rays reach its sensitive cell.

The LED 34 emits light signals 36. The LED 34 and the photodiode 35 are positioned in the housing 22 of the apparatus 2 such that:

when the housing 22 does not contain smoke particles, the photodiode 35 does not detect the light signals 36 emitted by the LED 34;

when the housing 22 contains smoke particles, the light signals 36 emitted by the LED 34 are at least partly reflected by said smoke particles and detected by the photodiode 35.

In this case, the LED 34 and the photodiode 35 are positioned in the housing 22 of the apparatus 2 such that the LED 34 emits light signals along a first axis X1, and the photodiode 35 optimally detects light signals impinging on its sensitive cell along a second axis X2 perpendicular to the first axis X1. Thus, when there are no smoke particles present in the housing 22 of the apparatus 2, the photodiode 35 does not detect the light signals emitted by the LED 34. On the other hand, when smoke particles are present, some of the light signals emitted by the LED 34 are reflected by the smoke particles and reach the photodiode 35.

The photodiode 35 outputs a binary electrical signal.

When no smoke is present, this binary signal adopts a first value.

When the quantity of smoke particles present in the secondary part exceeds a certain threshold, the binary electrical signal adopts a second value.

The microcontroller 28 comprises a port P1 connected to the LED 34 and a port P2 connected to the photodiode 35. The microcontroller 28 regularly produces a voltage that it applies to the terminals of the LED 34 via the port P1 so that said LED emits light signals, and acquires via the port P2 the binary electrical signal produced by the photodiode 35 to detect whether or not smoke is present in the housing 22 of the apparatus 2 and therefore in the room.

The message transmitted by the apparatus 2 to the meter 1 therefore includes information relating to the presence of smoke particles in the apparatus 2 (and therefore in the room outside the apparatus 2).

However, as set out above, the communication function of the CIS interface 18 is one-way and cannot be used by the apparatus 2 to transmit a structured message to the meter 1 via the two ports I1 and I2.

The secondary processing unit 24 therefore comprises components that allow it to transmit messages via the secondary ports 21 and therefore via the primary ports I1, A of the meter 1, which are power supply ports (and therefore not initially provided for receiving data).

These components comprise an energy reserve component 40 and a switch 41, which are used to transmit to the meter 1 the message containing the information relating to the presence of the smoke particles.

The energy reserve component is a storage capacitor 40, for example a 10 V/470 μF chemical capacitor. The capacitance could of course be different.

Information is transmitted as follows.

The switch 41 is fitted between the high-potential output S1 of the power supply unit 23 and a power supply port P3 of the microcontroller 28.

The capacitor 40 has a first terminal which is connected to the switch 41 and the power supply port P3.

The low-potential output S2 of the power supply unit 23 is connected to an earth port P4 of the microcontroller 28. The capacitor 40 has a second terminal which is connected to the low-potential output S2 and to the earth port P4.

The microcontroller 28 has a port CMDE that is connected to the switch 41 and via which it can control the switch 41 and selectively place it in an on state (closed: CMDE in a high state) or a locked state (open: CMDE in a low state).

The secondary processing unit 24 of the apparatus 2 transmits the message to the meter 1 by modulating the supply current Ia of the apparatus 2 that is produced by the meter 1 and flows via the primary ports I1, A and the secondary ports 21. The supply current Ia is therefore the current that powers the apparatus 2 under the supply voltage Va.

The modulation is performed via the switch 41. The switch 41 is "normally closed".

When the switch 41 is closed the microcontroller 28 is supplied with the supply current Ia provided by the power supply function of the CIS interface 18, and when the switch 41 is open the microcontroller 28 is supplied with a reserve current Ir from the capacitor 40.

Normally, therefore, the microcontroller 28 is supplied with the supply current Ia from the meter 1. The supply current Ia drawn is constant, for example approximately 100 mA, which gives the supply current a continuous high state.

When the microcontroller 28 detects smoke particles, it controls the switch 41 for a predefined length of time, for example 500 ms, to cut off its power supply via the power supply unit 23. The apparatus 2, and therefore in particular the microcontroller 28, is then self-powered by the storage capacitor 40. The apparatus 2 thus no longer draws any current, resulting in a low state of the supply current Ia during the predefined length of time.

However, the meter 1 can detect a variation in the supply current Ia supplied via the CIS interface 18, and therefore a load variation between the ports I1 and A.

Indeed, the meter 1 comprises a current sensor 43 which measures the supply current provided by the power supply function of the CIS interface 18. The application microcontroller 14*b* therefore retrieves the information relating to the presence of smoke from current measurements produced by said current sensor 43.

The message transmitted by the apparatus 2 to the meter 1 is therefore transmitted via a low state with a predefined duration. It would be possible to transmit different messages using low states with different durations.

The message(s) transmitted by the apparatus 2 to the meter 1 is/are not necessarily transmitted by one or more low states of the supply current Ia.

The message(s) could also each be transmitted by a time signature comprising a predefined sequence of high states and low states with predefined durations.

Figure 4:
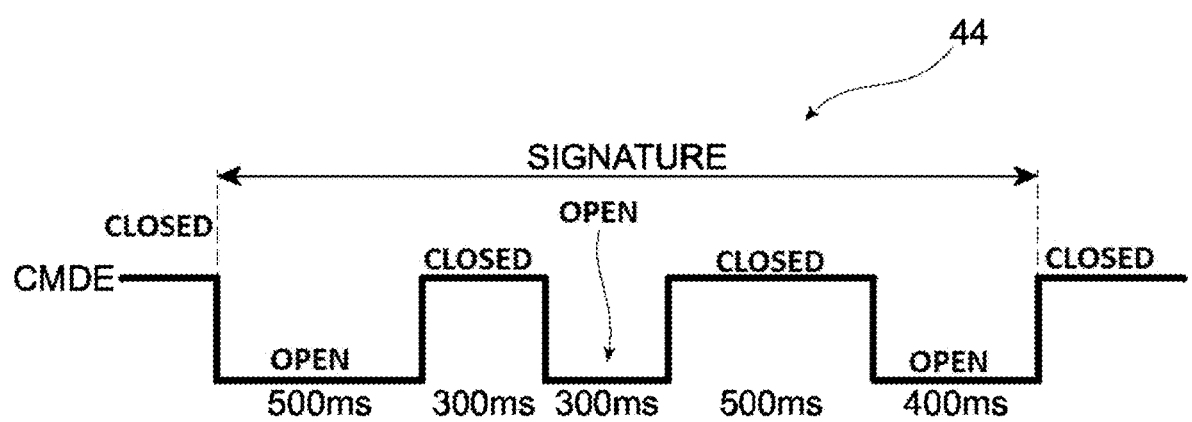
FIG. 4 shows a signature used by the ancillary apparatus to transmit a message to the meter.

A signature 44 of this kind is shown in FIG. 4. This signature comprises a first low state with a duration of 500 ms, a second low state with a duration of 300 ms and a third low state with a duration of 400 ms. The first low state and the second low state are separated by a high state with a duration of 300 ms. The second low state and the third low state are separated by a high state with a duration of 500 ms. Making the signature complex in this way allows information to be transmitted more robustly.

It goes without saying that it would be possible to have different signatures for transmitting different messages to the meter.

The application microcontroller 14*b* thus detects a fire occurring outside the meter 1 if smoke particles are present in the apparatus 2.

Advantageously, the meter 1 also uses temperature information provided by a temperature sensor 45 included in the (pre-existing) meter.

The temperature sensor 45 in this case is an NTC (negative temperature coefficient) thermistor.

The thermistor 45 is mounted on the printed circuit 17 and located at a non-hot point in the casing 5. It is therefore remote from the cut-off member 10. In this case, the thermistor 45 is located near a first corner of the printed circuit 17, and the cut-off member 10 is located near a second corner of the printed circuit 17, the first corner and the second corner being diagonally opposite.

This thermistor 45 can be used to evaluate the ambient temperature in the room outside the meter 1.

The temperature measured by the thermistor 45 is not directly the ambient temperature but a representation thereof.

The difference between the temperature measured by the thermistor 45 and the ambient temperature is a function of the current/flowing through the meter 1 (and consumed by the installation 3) and therefore via the cut-off member 10. The current/causes internal heating in the meter 1, which will act, by diffusion, on the temperature measured by the thermistor 45, regardless of the ambient temperature.

The primary processing unit 12 is therefore arranged to evaluate the ambient temperature from the temperature measurements produced by the thermistor 45 and from measurements of the current supplied to the installation 3, the electrical energy consumption of which is measured by the electricity meter 1.

The temperature α measured by the thermistor 45 is therefore a function of the ambient temperature Tamb (ambient around the meter 1 in its external surroundings in the room where it is located) and the value of the current I (which can typically range from 0 to 100 A and may be equal to 200 A in the USA):

$$\Theta = Tamb + \Delta T + K * I^2$$

ΔT being determined by design and typically being equal to 10° C., and K being a factor also determined by design and being such that, typically:

$$K = 0.025° \text{ C.}/A^2$$

By way of example, if a current of 60 A is passing through the meter 1, the difference between θ and Tamb will be:

$$(10 + 0.025 * 60^2) = 19° \text{ C.}.$$

The application microcontroller 14b therefore measures the resistance of the thermistor 45, deduces the temperature θ therefrom and then deduces the ambient temperature Tamb from the temperature θ. The application microcontroller 14b can therefore estimate the ambient temperature Tamb in real time.

The application microcontroller 14b then detects a fire occurring outside the meter 1:
  if smoke particles are present in the apparatus 2;
  and/or if the ambient temperature is above a predefined threshold and is thus abnormally high.
The predefined threshold is, for example, 60° C.

The application microcontroller 14b triggers a first alarm when smoke particles are present. The application microcontroller 14b triggers a second alarm when the temperature is abnormally high.

If one or both of these alarms are triggered, the meter 1 detects a fire. The meter 1 then sends a corresponding alarm message to the HES (head end system) of the IS of the electricity supplier. The alarm message may be a first alarm message indicating an "abnormally high ambient temperature" or a second alarm message indicating the "presence of smoke". The two alarm messages can be sent simultaneously.

As has been described, a fire will generally trigger at least one of the two alarms, if not both. The meter 1 will therefore signal, via the alarm message(s), that it has detected a probable fire in its surroundings before it is itself destroyed.

The sending and receipt of this or these alarm message(s) constitute conclusive proof that the meter 1 itself is not the cause of the fire and allow the meter 1 to be ruled out of the investigations. Indeed, if the fire originates from the meter 1 (or rather its incorrect installation a priori), the meter 1 will not immediately detect an abnormally high ambient temperature or smoke because it will be burning from the inside. The meter will therefore not have time to send an alarm message to the HES of the IS because it will be destroyed before it can do so. The fact that the HES has received at least one of the two alarm messages makes it possible to rule out the meter 1 as a cause in the event of a fire.

It goes without saying that the invention is not limited to the described embodiment but covers any variant falling under the scope of the invention as defined by the claims.

The ancillary apparatus could relay the CIS interface to a second module (CIS receiver), which would be connected to the ancillary apparatus. The position of the ancillary apparatus on the meter in the receiving space normally reserved for the CIS receiver therefore does not prevent a "conventional" CIS receiver from being connected to the meter.

Since the consumption of the ancillary apparatus is typically 130 mW, the meter recognises, even if there is a second CIS module connected behind the ancillary apparatus, that the signal is the smoke detection signal when it notes a load variation of at least 100 mW. The receipt of the data is of course more robust when an adequate signature is used (that of FIG. 4 for example).

The interface via which the ancillary apparatus is powered and communicates with the meter need not necessarily be a CIS interface. It could be a different communication interface, for example a serial port such as a P1 port (not to be confused with the port P1 in FIG. 3).

The smoke detection device could be different. The wavelength of the emitted light signals could be different. The components used different could be (for example a phototransistor instead of a photodiode). More generally, any type of technology can be used (e.g. a linear optical detector).

The ancillary apparatus need not necessarily comprise a smoke detection device, and the message(s) transmitted therefore need not necessarily be messages informing the meter of the presence of smoke. The meter could, for example, control cut-off relays in an installation by means of the ancillary apparatus, thereby making "intelligent" load shedding possible in particular. In that case, the ancillary apparatus includes a radio module for remotely controlling the cut-off relays. In this case, following the receipt of the command, the cut-off relay issues an acknowledgement which is received by the ancillary apparatus and then retransmitted to the meter by modulating the supply current.

The invention claimed is:

1. An ancillary apparatus arranged to be mounted on an electricity meter which comprises at least one primary port to which the electricity meter applies a supply voltage, the ancillary apparatus comprising:
   at least one secondary port arranged to be connected to the at least one primary port when the ancillary apparatus is mounted on the meter, the ancillary apparatus thus being electrically powered by the supply voltage; and
   a secondary processing unit arranged to transmit at least one message to the electricity meter by modulating a supply current of the ancillary apparatus that is produced by the meter and flows via the at least one primary port and the at least one secondary port.

2. The ancillary apparatus according to claim 1, the secondary processing unit comprising:
   a processing component;
   an energy reserve component; and
   a switch arranged such that when the switch is closed the processing component is powered by the supply current, and when the switch is open the processing component is powered by a reserve current from the energy reserve component; and
   the processing component being arranged to modulate the supply current by opening and closing the switch.

3. The ancillary apparatus according to claim 1, wherein the secondary processing unit transmits the at least one message to the electricity meter by producing at least one low state of the supply current.

4. The ancillary apparatus according to claim 3, wherein the secondary processing unit transmits the at least one message to the electricity meter by producing a signature comprising a predefined sequence of high states and low states with predefined durations.

5. The ancillary apparatus according to claim 1, comprising a housing provided with at least one opening and in which the secondary processing unit and a smoke detection device are integrated, the smoke detection device being arranged to detect smoke particles that have come from outside the ancillary apparatus and entered the ancillary apparatus through the at least one opening, the at least one message containing information relating to the presence of the smoke particles.

6. The ancillary apparatus according to claim 5, the smoke detection device comprising a light emitter, arranged to emit light signals, and a light receiver, which are positioned in the housing of the ancillary apparatus such that:
   when the housing does not contain smoke particles, the light receiver does not detect the light signals emitted by the light emitter; and
   when the housing contains smoke particles, the light signals emitted by the light emitter are at least partly reflected by said smoke particles and detected by the light receiver.

7. An electricity meter arranged so that the ancillary apparatus according to claim 1 can be mounted on said electricity meter, the electricity meter comprising:
   a current sensor arranged to measure the supply current;
   a primary processing unit arranged to retrieve the at least one message from current measurements produced by the current sensor.

8. An electricity meter arranged so that the ancillary apparatus according to claim 5 can be mounted on said electricity meter, the electricity meter comprising:
   a current sensor arranged to measure the supply current; and
   a primary processing unit arranged to retrieve the at least one message from current measurements produced by the current sensor;
   the primary processing unit of the electricity meter being arranged to detect a fire occurring outside the meter when smoke particles are present in the ancillary apparatus.

9. The electricity meter according to claim 8, wherein a temperature sensor is also included, the primary processing unit being arranged to evaluate an ambient temperature outside the meter from temperature measurements produced by the temperature sensor, the primary processing unit being arranged to detect a fire occurring outside the meter:
   if smoke particles are present in the ancillary apparatus; and
   and/or if the ambient temperature is above a predefined threshold.

10. The electricity meter according to claim 9, the primary processing unit being arranged to evaluate the ambient temperature from the temperature measurements and from measurements of a current supplied to an installation, the electrical energy consumption of which is measured by the electricity meter.

11. A system comprising the meter according to claim 7 having the ancillary apparatus mounted thereon.

12. A method for detecting a fire and a cause of the fire, carried out in the main processing unit of the meter according to claim 8 and comprising the steps of:
   acquiring the message that contains the information relating to the presence of the smoke; and
   detecting a fire occurring outside the meter if smoke particles are present in the ancillary apparatus.

13. The method according to claim 12, carried out in the main processing unit of the meter and further comprising the steps of:
   evaluating the ambient temperature outside the meter; and
   detecting a fire occurring outside the meter if smoke particles are present in the ancillary apparatus and/or if the ambient temperature is above a predefined threshold.

14. A non-transitory computer-readable storage medium on which a computer program is stored the computer program comprising instructions that cause a primary processing unit of a meter to execute the steps of the method according to claim 12 for detecting a fire and the cause of the fire.

* * * * *